United States Patent [19]

Blair et al.

[11] Patent Number: 4,945,738

[45] Date of Patent: Aug. 7, 1990

[54] METER BOX LOCKS

[75] Inventors: Richard W. Blair; Jack R. Grant, both of Houston, Tex.

[73] Assignee: Houston Industries Incorporated, Houston, Tex.

[21] Appl. No.: 436,343

[22] Filed: Nov. 14, 1989

[51] Int. Cl.⁵ .............................................. B65D 55/00
[52] U.S. Cl. ........................................ 70/161; 70/164; 70/232; 292/251; 292/327
[58] Field of Search .............................. 220/214, 315; 292/DIG. 11, 327, 251; 70/232, 164, 163, 166, 158, 159, DIG. 57, DIG. 34; 411/174, 175

[56] References Cited

U.S. PATENT DOCUMENTS

| 286,077 | 10/1883 | Sargent | 70/DIG. 57 X |
|---|---|---|---|
| 1,786,826 | 12/1930 | Cooper | 220/214 |
| 1,925,059 | 8/1933 | Sheard et al. | 292/251 |
| 2,008,104 | 7/1935 | Juvinall | 292/307 R |
| 4,008,585 | 2/1977 | Lundberg | 70/164 |
| 4,080,811 | 3/1978 | Nielsen, Jr. | 70/164 |
| 4,107,959 | 8/1978 | Skarzynski et al. | 70/164 X |
| 4,144,729 | 3/1979 | Nielsen, Jr. | 70/DIG. 57 X |
| 4,284,300 | 8/1981 | Campbell | 70/DIG. 34 X |
| 4,329,860 | 5/1982 | Moberg | 70/164 |

FOREIGN PATENT DOCUMENTS 2591013  6/1987  France ............................... 220/214

*Primary Examiner*—Lloyd A. Gall
*Attorney, Agent, or Firm*—Pravel, Gambrell, Hewitt, Kimball & Krieger

[57] ABSTRACT

Locks securely close a commercial electric power meter box at the front of the meter box where it is visible by a meter reader. One version of the lock readily indicates unauthorized entry into the meter box by extending the seal to the front of the box. Another version of the lock requires a special tool to remove the lock in addition to extending the seal to the front of the box. Yet another version of the lock is equipped with a fully enclosed and protected cylinder lock, which cannot be opened without a special tool and a key even if the seal is broken. All of the locks can be easily installed on existing commercial meter box installations.

15 Claims, 3 Drawing Sheets

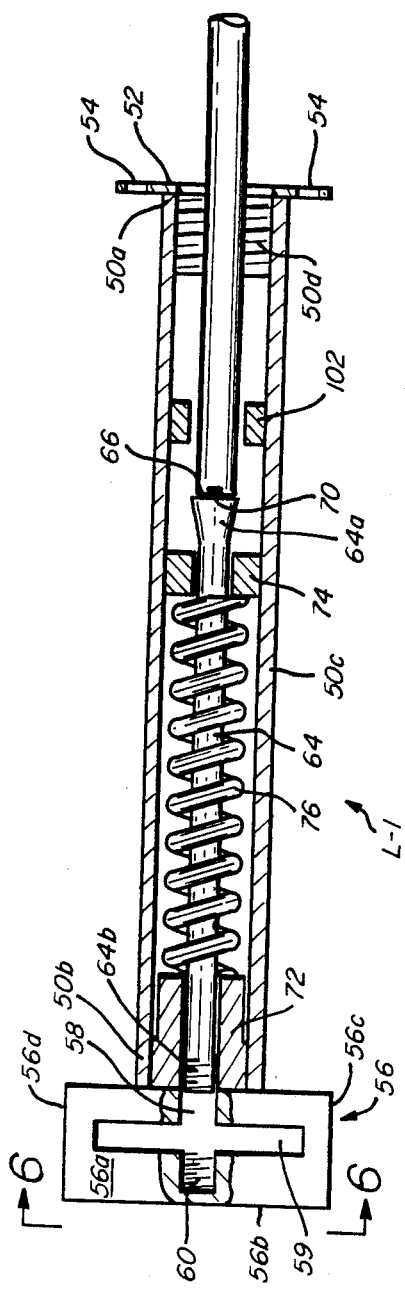
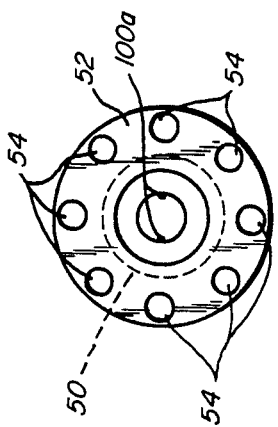
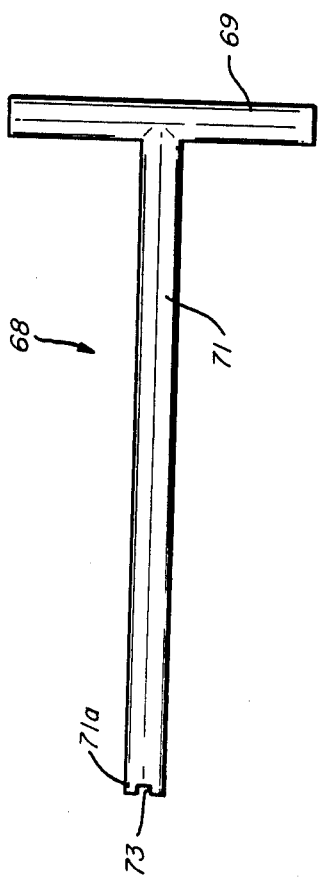
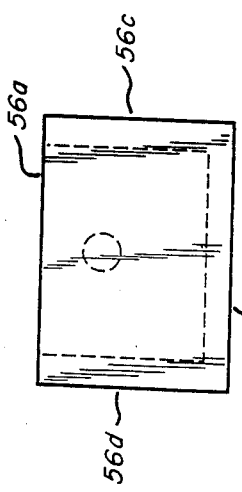

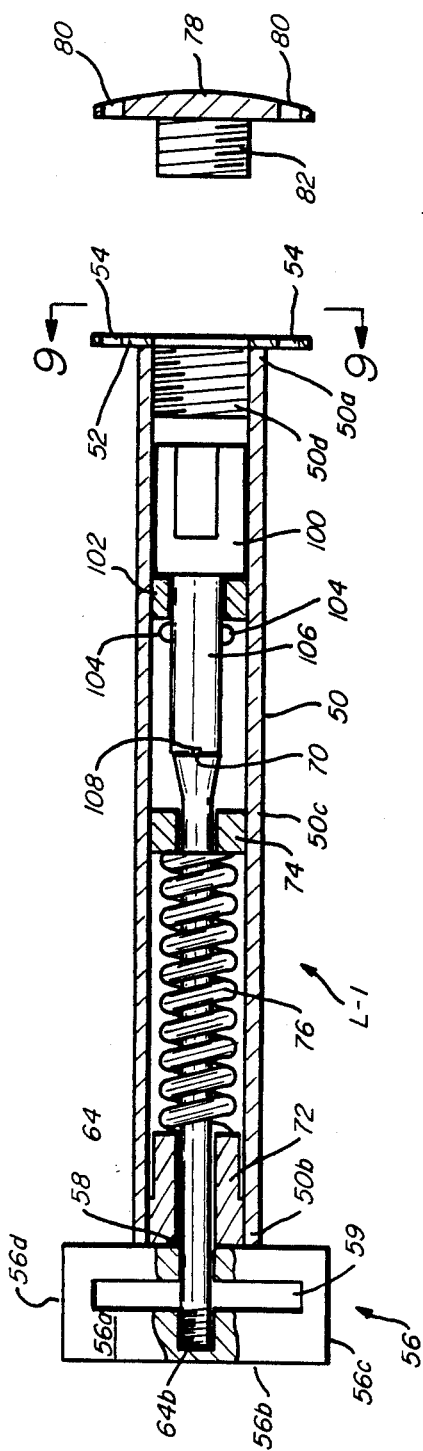
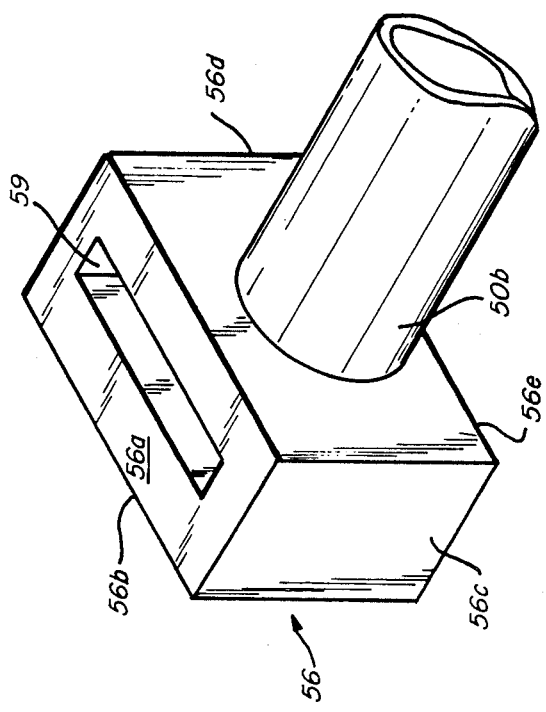
FIG. 8
FIG. 10

METER BOX LOCKS

BACKGROUND OF THE INVENTION

1. Field of the Invention

The present invention relates to locks for an electrical power meter box.

2. Description of the Prior Art

Although in at least some jurisdictions to do so is a criminal act, unauthorized use of electrical power is a major problem for electrical utilities. Detecting and prosecuting unauthorized use of electricity by commercial establishments is an expensive and difficult task. Certain businesses, such as supermarkets, have a generally constant load factor which can be monitored by computer to detect abrupt load increases. However, those who make unauthorized use from the beginning of electrical service cannot be detected by computer, since there is no track record or history of electricity usage. Thus, unauthorized use may often only be detected by meter readers or other field personnel.

Commercial electrical power meter boxes, also known in the industry as cans, have been manufactured the same basic way for many years. The boxes are comprised of a front half and a rear half, with the two halves being hinged together at the top. To gain access to tap and use electricity without authorization, one need only open a meter box or can and close the master power switch. To protect against such unauthorized entry, tabs at the bottom of the box halves have in the past been held closed together with a wire seal. A broken seal indicated unauthorized entry into the meter box.

A meter reader making periodic power usage readings could then also inspect the seal to determine if it had been broken. If so, it is probable that unauthorized entry into the meter box was likely and that unauthorized use was being made of electrical power. However, the seal was located at the bottom wall of the meter box approximately halfway between the front and back of the box.

For example, in U.S. Pat. No. 2,008,104 a bolt is inserted through the tabs in lower wall of a meter cover and secured with a nut. A seal is inserted through openings or apertures in the bolt and nut to prevent unauthorized access to the meter. The seal was, however, at the bottom of the meter cover, a location typically at or below waist level of a meter reader. Unless the meter reader was particularly thorough and took the extra time to check the seal, a broken seal could be undetected for some period of time.

Examples of other electric power meter locks are described in U.S. Pat. No. 4,031,722; U.S. Pat. No. 4,080,8111; U.S. Pat. No. 4,144,729; U.S. Pat. No. 4,254,647; and U.S. Pat. No. 4,414,829. All of these patents provided locks for meter cans having an openable front cover. However, none of these locks were adapted to be used on commercial meter enclosure boxes nor did these locks locate the seal in an easily visible position.

Examples of locking ring assemblies for glass meter covers are found in U.S. Pat. No. 4,329,860 and U.S. Pat. No. 4,415,190. Examples of other types of locks are U.S. Pat. No. 1,067,549; U.S. Pat. No. 1,188,886; U.S. Pat. No. 1,664,820; U.S. Pat. No. 3,157,040; U.S. Pat. No. 3,172,282 and U.S. Pat. No. 4,406,358.

SUMMARY OF THE INVENTION

Briefly, the present invention provides new and improved locks for commercial electrical power meter boxes having closure tabs in the bottom wall of the box. The locks have a socket member adapted to fit over the closure tabs of the meter box. A sleeve is connected to the socket member for extending the wire seal to the front of the meter box. The outer end of the sleeve has a flange connected to it. The flange has a series of apertures therethrough which surround the sleeve. A lock rod member is insertable through the sleeve and into the socket member where the rod passes through the closure tabs of the box for locking same. A cap having a series of apertures closes the outer end of the sleeve. The cap apertures are aligned with the apertures in the flange to permit a wire seal to be inserted therethrough.

Locks according to the present invention are easily and quickly installable on commercial meter enclosure boxes with no requirement for replacement or retrofitting of the thousands of existing meter boxes.

BRIEF DESCRIPTION OF THE DRAWINGS

FIG. 5 is a top view, taken partly in cross-section, of an installed meter box lock according to another embodiment of the present invention;

FIG. 6 is a view taken along lines 6—6 of FIG. 5;

FIG. 7 is an elevation view of a tool for locking a meter box with the lock of FIGS. 5, 6 and 8;

FIG. 8 is a cross-sectional view of the meter box lock of FIG. 5 with an additional lock installed;

FIG. 9 is a view taken along the lines 9—9 of FIG. 8; and

FIG. 10 is an enlarged isometric view of a portion of the lock of FIGS. 5, 6, 8 and 9.

DETAILED DESCRIPTION OF THE INVENTION

Figure 1:
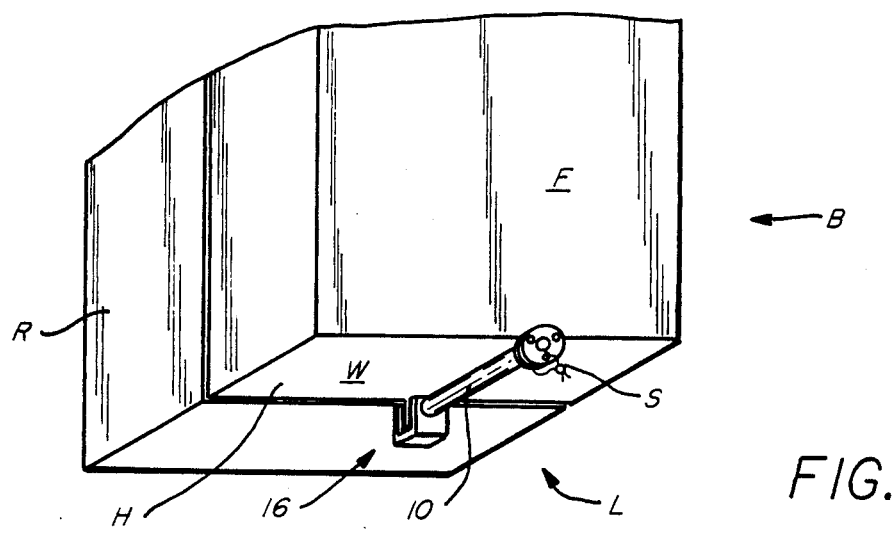
FIG. 1 is an isometric view of an installed meter box lock according to the present invention.

In the drawings, the letter L (FIGS. 1-4) designates generally a first embodiment meter box lock according to the present invention for locking and extending the wire seal S on an electrical power meter box B to a visible area. The wire seal S is a conventional seal which is not reusable. Therefore, an unbroken seal indicates that the meter box B has not been tampered with by unauthorized persons. The meter box B is a conventional commercial electrical power meter box comprised of two halves, a front half H and a rear half R, which are connected together at the top, conventionally by a hinge connection which is not shown. The box halves H and R have like-shaped downwardly facing closure tabs T (FIG. 2) through which the seal S was previously typically inserted for protecting against unauthorized entry into the meter box B.

Figure 2:
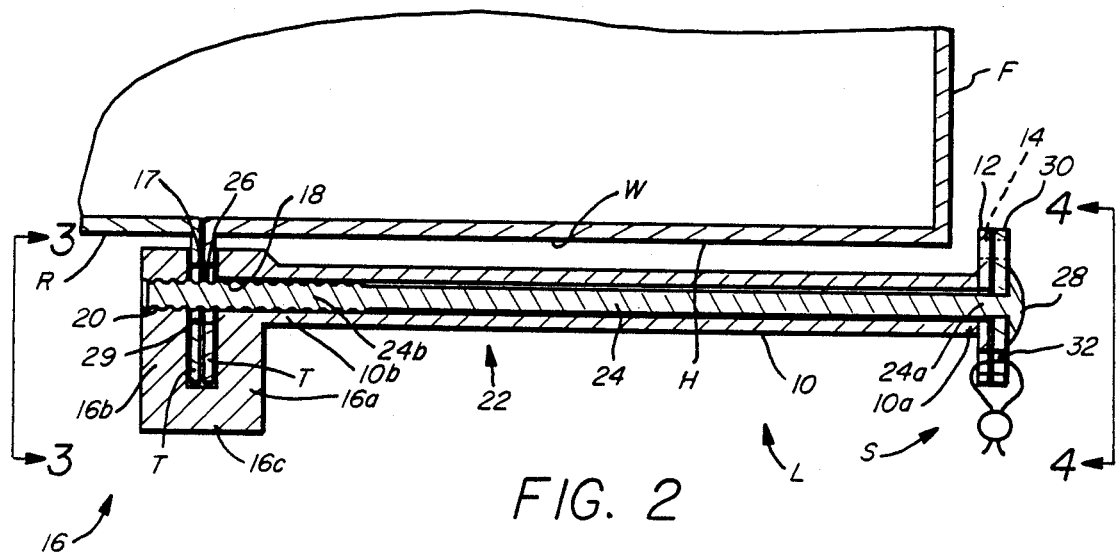
FIG. 2 is an elevation view, taken partly in cross-section of an installed meter box lock according to the present invention.
Figure 3:
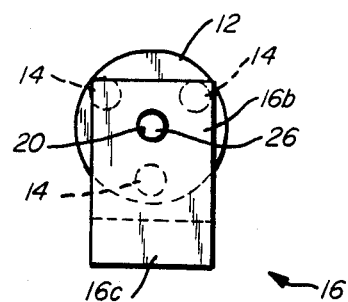
FIG. 3 is a view taken along the lines 3—3 of FIG. 2.
Figure 4:
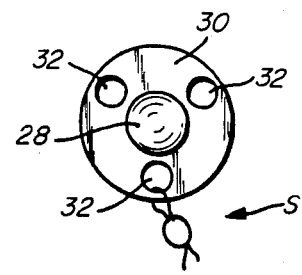
FIG. 4 is a view taken along the lines 4—4 of FIG. 2.

The structure of the lock L is more clearly shown in FIG. 2. The lock L readily indicates unauthorized entry into the meter box by extending the seal S to a front face F of the box B. The components of the lock L are formed from a suitable strength steel or other suitable material. The lock L has a hollow sleeve 10 with a flange 12 connected to an outer end 10a of the sleeve 10. The flange 12 extends outwardly from outer end 10a of the sleeve 10. A suitable number of openings or apertures 14 are formed extending through the flange 12 about its periphery.

The sleeve 10 has a length between outer end 10a and an inner end 10b generally equal the extent of a bottom wall W of the front half F from the closure tabs T. In this manner, the flange 12 is located at or beyond front face F of the box B when the lock L is fitted over the closure tabs T of the box B. According to the present invention, at or beyond is intended to mean that a meter reader or other inspector can see both the wire seal S and the meter of the box B at the same time.

A socket member 16 is formed on the inner end 10b of the hollow sleeve 10. The socket member 16 is U-shaped, having arms 16a and 16b extending upwardly from a base 16c to form a notch or gap 17 into which the closure tabs T of the box B (FIG. 2) can be fitted. Arm 16a defines an outer end and arm 16b defines an inner end of the socket member 16. The socket 16 has a passage port 18 of like inner diameter to that of the hollow sleeve 10. The socket member 16 also has an internally threaded end port 20 formed within a portion arm 16b of the U-shaped socket 16.

A lock rod 22 is formed of a bolt 24 having a threaded shaft 26 at an inner end 24b and a bolt head 28 at an outer end 24a. The shaft 26 of the lock rod 22 is of a diameter to permit its passage through the hollow sleeve 10, passage port 18 and holes 29 of the closure tabs T. The diameter and type of threads formed on the threaded shaft 26 are matched to the diameter and type of threads formed in threaded end port 20.

A cap 30 circumscribes and is mounted to the bolt head 28 at the outer end 24a of lock rod bolt 24. The cap 30 has a matching diameter to that of the flange 12 and also has a series of apertures or openings 32 adapted for alignment with the apertures 14 of the flange 12. In this manner, when the lock L is locked and apertures 32 and 14 aligned, the seal S may be inserted.

In using the lock L, the socket member 16 is fitted over the closure tabs T of a closed meter box B. The lock rod 22 is inserted into the sleeve 10 and the passage port 18 of the socket 16 through the holes 29 of the closure tabs T. The lock rod 22 is then rotated to engage the threaded shaft 26 into the threaded end port 20. After fully engaging the lock rod 22 in the threaded end port 20, some minor adjustment of the lock rod 22 may be required to align a selcted aperture 32 of the cap 30 with one of the apertures 14 of the flange 12 so that the seal S may then be installed.

With the lock L, the box B cannot be opened unless the lock rod 22 is removed from the threaded engagement in the socket member 16. However, to do so requires that seal S be broken so that lock rod 22 can be rotated. Due to the nature of the lock L, however, for reasons set forth above, the broken seal S is clearly visible, due to its location, when the box B is next inspected.

An alternative embodiment of a lock (FIGS. 5, 6, 8, 9 and 10) according to the present invention is designated as L-1. Lock L-1 may be used in situations, for example, where it is desired to provide additional security to that of lock rod 22 of lock L. Lock L-1 is adapted for use on boxes B of like construction to those shown in FIG. 1. The lock L-1, shown in FIG. 5, has a hollow sleeve 50 with a flange 52 formed at an outer end 50a of the sleeve 50. The sleeve 50 has a length between outer end 50a and an inner end 50b generally equal to the extent of the bottom wall W of the front half H from the closure tabs T, as was the case with the lock L. In this manner, the flange 52 is located at or beyond, as defined above, the front face F of the box B when the lock L-1 is fitted over the closure tabs T of the box B.

A suitable number of openings or apertures 54 are formed extending through the flange 52 about its periphery. A socket 56 is mounted on the inner end 50b of the sleeve 50. The socket member 56 a generally rectangular block of suitable strength material into which is a cup-shaped opening or socket 59, which is formed to fit over and around the edges of the closure tabs T of the box B. The cup-shaped opening 59 of socket member 56 is accessible only from a top surface 56a of member 56, which fits below the bottom wall of the box B when the lock L-1 is in place.

A threaded end port 60 (FIG. 5) is formed in body portion 56b of cup member 56 adjacent the pocket 59. The threads formed in port 60 are of a like type and diameter to those formed at an inner end 64b of a lock rod 64. When the threads of port 60 and lock rod 64 are engaged (FIG. 8) after the lock rod has passed through tabs T in pocket 59, cup member 56 (due to its side walls 56c and 56d and bottom wall 56e) prevents unauthorized entry into pocket 59. This bars access into the box B by using a saw, such as a hacksaw, to cut through the lock rod 64. The socket member 56 has a passage port 58 to allow the lock rod 64 to pass from sleeve 50 into the pocket 59.

An outer end 64a of the lock rod 64 is adapted to be engaged with a tool 68 (FIG. 7) which is utilized to rotate the lock rod 64. The outer end 64a of lock rod 64 is shown as having a flat outer surface 66, similar to that of a flat screwdriver. The tool 68 is shown as being T-shaped, having transversely formed handle 69 for rotating a shaft member 71. The shaft member 71 has a recessed groove 73 formed in an end 71a for engaging with a raised lug 70 formed extending laterally across the flat end 66 of the lock rod 62. It should be understood that the raised lug 70 may be cruciform or + shaped so long as groove 73 on tool 68 is modified accordingly. Similarly, lug 70 may be replaced with a recessed slot and tool 68 provided with an outwardly extending lug, if desired. Various other key and groove mechanisms may also be used, if desired.

It can be seen that the lock rod 64 is shorter in length than sleeve 50 in lock L-1, extending between a stationary guide bushing 72 fixedly mounted within the inner end 50b of sleeve 50 and a movable or floating guide busing 74 within an intermediate portion 50c of sleeve 50. The lock rod 64 is fixedly mounted to floating guide bushing 74.

A coil spring 76 extends between guide bushings 72 and 74, normally biasing the lock rod 64 to the position shown in FIG. 5. When, however, tool 68 is inserted into sleeve 50 and raised lug 70 engaged by groove 73 (FIG. 5), force may be exerted to compress coil spring 76. Lock rod 64 may then be moved within sleeve 50 until threaded inner end 64a of lock rod 64 is in contact with threaded end port 60 of cup member 59. The tool 68 may then be rotated until the threaded end 64a is firmly within threaded end port 60. The lock L-1 is now locked, with the lock rod 64 well recessed in sleeve 50 (FIG. 8).

An end cap 78 having a number of circumferentially spaced openings 80 and an inwardly extending connector screw 82 is adapted to be installed on flange 52 of sleeve 50. The threads on screw 82 mate with those formed at 50d within the outer end 50a of sleeve 50. With end cap 78 installed on sleeve 50, a conventional seal S may then be inserted through the openings 54 and 80.

As was the case with the lock L, the seal S is mounted at or near the front wall of the box B, making tampering with the seal S easy to detect. Further, even if the seal S of lock L-1 is broken and end cap 78 removed, the outer surface or head 66 of lock rod 64 is recessed in the sleeve 50, making it very difficult to determine what type of tool is needed to release threaded end 64b from port 60 to unlock lock L-1.

The lock rod 64 is shorter in length then sleeve 50 in lock L-1, as has been set forth. Accordingly, special tool 68 is required to be inserted into the outer end of sleeve 50 to disengage the lock rod 64 from the end port 60. Without the special tool 68, rotation of the lock rod 64 is made extremely difficult.

As a further protective mechanism, an additional lock in the form of a cylinder lock 100 may be added to the lock L-1 (FIG. 8). The cylinder lock 100 is of the conventional, commercial type and its inner details are not thus shown. Lock 100 is adapted to be inserted in the outer end 50a of the sleeve 50 past threads 50d. The cylinder lock 100 is thus recessed inside the sleeve 50 to prevent attempts to pry out the cylinder lock 100. A lock stop 102 is mounted inside the sleeve 50 between floating bushing 74 and threads 50d. The lock stop 102 serves as a movement barrier for cylinder lock 100. When cylinder lock 100 is in proper position in lock L-1 (FIG. 8), it may be locked by a key inserted into slots 100a (FIG. 9), so that retractable locking beads 104 are firmly locked in the position shown. Lock stop 102 engages locking beads 104 and prevents removal of cylinder locks 100 from the lock L-1. When cylinder lock 100 is unlocked, however, locking beads 104 are movable inwardly and are cammed inwardly by lock stop 102, permitting removal of lock 100 from lock L-1.

A cylinder lock guide 108 is formed on cylinder lock inner portion 106. The cylinder lock guide 108 is sized to mate and engage with the particular form of raised lug 70 or recess formed on flat surface 66 of threaded rod 64. When threaded rod 64 is locked, lock guide 108 engages lug 70, inhibiting rotational movement of lock 100 with respect to the sleeve 50. This permits the two relatively rotatable movable parts of lock 100 to move with respect to each other when the proper key is inserted, locking and unlocking the cylinder lock 100. When the cylinder lock 100 is locked in place, end cap 78 and seal S may be attached to the lock L-1. With the cylinder lock 100 in lock L-1, the meter box B is virtually tamper proof.

The foregoing disclosure and description of the invention are illustrative and explanatory thereof, and various changes in the size, shape and materials, as well as in the details of the illustrated construction may be made without departing from the spirit of the invention.

We claim:

1. A lock for an electrical power meter box having closure tabs in a wall thereof comprising:
    (a) sleeve means having a flange at an outer end, said flange having apertures therethrough;
    (b) socket means having an outer end fixed to an inner end of said sleeve means, said socket means being adapted to fit over the closure tabs of the box;
    (c) said sleeve means being of a length such that said flange is located at or beyond the outer edge of the wall of the box when said socket means is fitted over the closure tabs of the box;
    (d) lock rod means insertable through said sleeve means into said siocket means and through the closure tabs of the box for locking same; and
    (e) cap means having apertures adapted for aligning with apertures of said flange for a wire seal to be inserted therethrough.

2. The lock of claim 1, wherein said socket means is U-shaped to fit over the closure tabs of the box.

3. The lock of claim 1, wherein said socket means is cup-shaped to fit over and around the edges of the closure tabs of the box.

4. The lock of claim 1, wherein said socket means has a passage port to allow said lock rod means to be inserted into said socket means and said socket means has an end port which is internally recessed within said socket means to receive said lock rod means after same passes through said passage port and the closure tabs of the box.

5. The lock of claim 4, wherein said lock rod means has external threads on an inner end portion and said end port has matching internal threads for engaging said external threads of said lock rod means.

6. The lock of claim 5, wherein said lock rod means comprises a bolt having a threaded inner end portion and a bolt head at the outer end portion.

7. The lock of claim 6, wherein said cap means is mounted to a face of said bolt head.

8. The lock of claim 5, further comprising:
    (a) guide means located within said sleeve means for maintaining said lock rod means in proper alignment;
    (b) lock rod retracting means located within said sleeve means for selectively biasing said lock rod means from said socket means.

9. The lock of claim 8, wherein said guide means comprises:
    (a) inner sleeve bushing means for maintaining said lock rod means in alignment with said passage port and said end port; and
    (b) floating bushing means for centering the outer end of said lock rod means in said sleeve means.

10. The lock of claim 8, wherein said lock rod retracting means comprises a compression spring which biases said lock rod means away from said socket means when said lock rod means is disengaged from said end port.

11. The lock of claim 8, wherein said lock rod means comprises a rod having a threaded inner end portion and an outer end shaped to engage with a tool; said outer end of said rod means maintaining a floating bushing around said rod means.

12. The lock of claim 11, wherein said cap means comprises a plug having said apertures adapted for aligning with said apertures of said flange for a meter seal to be inserted therethrough.

13. The lock of claim 12, wherein said plug has an externally threaded stem and said sleeve means has an outer internal threaded portion for engaging said threaded plug stem.

14. The lock of claim 11 further comprising:
    (a) a cylinder lock insertable within an outer end of said sleeve means;
    (b) stopping means within said sleeve means for preventing removal of said cylinder lock when locked; and
    (c) holding means within said sleeve means for selectively preventing rotation of said cylinder lock.

15. The lock of claim 14, wherein said cylinder lock is recessed within said sleeve means.

* * * * *